(12) United States Patent
Gupta et al.

(10) Patent No.: US 7,152,033 B2
(45) Date of Patent: Dec. 19, 2006

(54) METHOD, SYSTEM AND MODULE FOR MULTI-MODAL DATA FUSION

(75) Inventors: Anurag Kumar Gupta, Calcutta (IN); Ying Catherine Cheng, Paddington (AU)

(73) Assignee: Motorola, Inc., Schaumburg, IL (US)

( * ) Notice: Subject to any disclaimer, the term of this patent is extended or adjusted under 35 U.S.C. 154(b) by 785 days.

(21) Appl. No.: 10/292,094

(22) Filed: Nov. 12, 2002

(65) Prior Publication Data

US 2004/0093215 A1    May 13, 2004

(51) Int. Cl.
*G10L 11/00* (2006.01)
*G10L 21/00* (2006.01)
(52) U.S. Cl. .................... 704/270; 704/270.1
(58) Field of Classification Search ............... None
See application file for complete search history.

(56) References Cited

U.S. PATENT DOCUMENTS

| | | | | |
|---|---|---|---|---|
| 5,748,974 A | * | 5/1998 | Johnson .................. | 704/9 |
| 5,781,179 A | * | 7/1998 | Nakajima et al. ........ | 345/157 |
| 6,779,060 B1 | * | 8/2004 | Azvine et al. ........... | 710/65 |
| 6,807,529 B1 | * | 10/2004 | Johnson et al. .......... | 704/270.1 |

OTHER PUBLICATIONS

Wu et al. "Multimodal Integration—A Statistical View", IEEE Transactions on Multimedia, vol. 1, Issue 4, Dec. 1999, pp. 334-341.*

Johnston et al., "MATCH: An Architecture for Multimodal Dialogue Systems", Proceedings of 40th Annual Meeting of Association of Computational Linguistics (ACL-02), Philadelphia, pp. 376-383.*

Article by Oviatt, S.L., DeAngeli, A. and Kuhn, K., titled "Integration and synchronization of input modes during multimodal human-computer interaction" in proceedings of conference on Human Factors in Computing Systems CHI'97 (Mar. 22-27, Atlanta, GA). ACM Press, NY, 1997, 415-422.

Article by Johnston, M., Cohen, P.R., McGee, D., Oviatt, S.L., Pittman, J.A., and Smith, I., titled "Unification based multimodal integration" in proceedings of the 35th Annual Meeting of the Association of Computational Linguistics, ACL. New York, 1997, 281-288.

Article by Vo, M.T., titled "A Framework and Toolkit for the Construction of Multimodal Learning Interfaces", Thesis, School of Computer Science, Carnegie Mellon University, Apr. 1998; and.

* cited by examiner

*Primary Examiner*—Vijay Chawan
*Assistant Examiner*—Eunice Ng

(57) ABSTRACT

A method for multi-modal data fusion (100), a multi-modal system data fusion system (10) and module (24) that in use operates by receiving segments (125) of multi-modal data associated respectively with a modalitiy. Initiating (130) a dynamically variable wait period after one of the segments is received is then performed. The dynamically variable wait period has a duration determined from data fusion timing statistics of the system (10). A waiting (140) for reception of any further segments during the dynamically variable wait period is then effected and thereafter a fusing (145) of the segments received provides fused data that is sent (160) to a dialog manager (25).

9 Claims, 3 Drawing Sheets

METHOD, SYSTEM AND MODULE FOR MULTI-MODAL DATA FUSION

FIELD OF THE INVENTION

This invention relates to a method system and module for multi-modal data fusion. The invention is particularly useful for, but not necessarily limited to, real time multi-modal data fusion.

BACKGROUND ART

In interactive multi-modal data fusion systems, data, requests and commands are received and processed from a variety of input modalities including speech, text and graphics. The multi-modal data, requests and commands are combined and acted upon by a dialog manager. Known interactive multi-modal data fusion systems have a static wait period (for example 4 seconds) to combine multi-modal data, requests and commands and send to the dialogue manager. In such multi-modal systems, the system waits to receive a first data packet, request or command from the user after the generation of a system response. Once the first data packet, request or command has been received from a modality, the data fusion system waits for the static time period to receive further data packet, request or command from other modalities. After the end of the static time period all the data packet, request or command received during that period are fused together using different methods, such as unification, agglomeration or otherwise.

This static wait period can provide an observable delay and erroneous responses may be provided by the dialog manager as this period may be too short for specific users or for complex requests and commands. Furthermore, the static waiting period may be too long for certain input modalities for example touch input but too short for others for instance speech input.

In this specification, including the claims, the terms 'comprises', 'comprising' or similar terms are intended to mean a non-exclusive inclusion, such that a method or apparatus that comprises a list of elements does not include those elements solely, but may well include other elements not listed.

SUMMARY OF THE INVENTION

According to one aspect of the invention there is provided a method for multi-modal data fusion in a multi-modal system comprising a plurality of input modalities, the method comprising the steps of:
  (i) receiving one or more segments of multi-modal data, each of said segments being associated respectively with said modalities;
  (ii) initiating a dynamically variable wait period after one of said segments is received, said dynamically variable wait period having a duration determined from data fusion timing statistics of the system;
  (iii) waiting for reception of any further said segments during said dynamically variable wait period; and
  (iv) fusing said segments received during said steps (i) to (iii) to provide fused data.

The method may suitably characterized by repeating steps (ii) to (iv) if one or more said further said segments are received during said dynamically variable wait period.

Preferably, the method may include the further step of sending said fused data to a dialog manager.

Suitably, the duration of the timing statistics may be determined from historical statistical data of the system.

Preferably, the historical statistical data may include average segment creation time for each modality of said system.

Preferably, duration of the dynamically variable wait period can be further determined from analysis of a period starting after completion of receiving one of said segments and ending after completion of receiving a further one of said segments.

Preferably, duration of the dynamically variable wait period can be determined from analysis of the following:

min (max(AvgDur$_m$) or (AvgTimeDiff+AvgDur))

where AvgDur$_m$ is a value indicative of the average duration associated with processing a user request into a one of said segments for a modality m, AvgTimeDiff is a value indicative of an average period for periods starting after completion of receiving one of said segments and ending after completion of receiving a further one of said segments, and AvgDur is a value indicative of the average duration associated with processing a user request into a one of said segments for every modality in the system.

Preferably, said segments can be frames.

Suitably, said frames may include temporal characteristics including at least part of said historical statistical data. The frames may also include semantic representations an associated user request.

According to another aspect of the invention there is provided a multi-modal data fusion system comprising:
  a plurality of modality processing modules;
  a plurality of parsers coupled to a respective one of said modality processing modules;
  a multi-modal fusion module having inputs coupled to outputs of said parsers, wherein in use said fusion module receives one or more segments of multi-modal data from at least one of said parsers, and initiates a dynamically variable wait period after one of said segments is received, said dynamically variable wait period having a duration determined from data fusion timing statistics of the system, the fusion module then waits for reception of any further said segments during said dynamically variable wait period and fuses said segments received to provide fused data.

Suitably, there is a dialogue manager coupled to an output of said fusion module.

Preferably, there are user input devices coupled respectively to said modality processing modules.

Suitably, the system may in use effect any or all combinations of the steps and characteristics of the above method.

According to another aspect of the invention there is provided a multi-modal fusion module having inputs for coupling to outputs of parsers, wherein in use said fusion module receives one or more segments of multi-modal data from at least one of said parsers, and initiates a dynamically variable wait period after one of said segments is received, said dynamically variable wait period having a duration determined from data fusion timing statistics of the system, the fusion module then waits for reception of any further said segments during said dynamically variable wait period and fuses said segments received to provide fused data.

Suitably, said fusion module may in use effect any or all combinations of the steps and characteristics of the above method.

BRIEF DESCRIPTION OF THE DRAWINGS

In order that the invention may be readily understood and put into practical effect, reference will now be made to a preferred embodiment as illustrated with reference to the accompanying drawings in which.

DETAILED DESCRIPTION OF THE PREFERRED EMBODIMENT OF THE INVENTION

Figure 1:
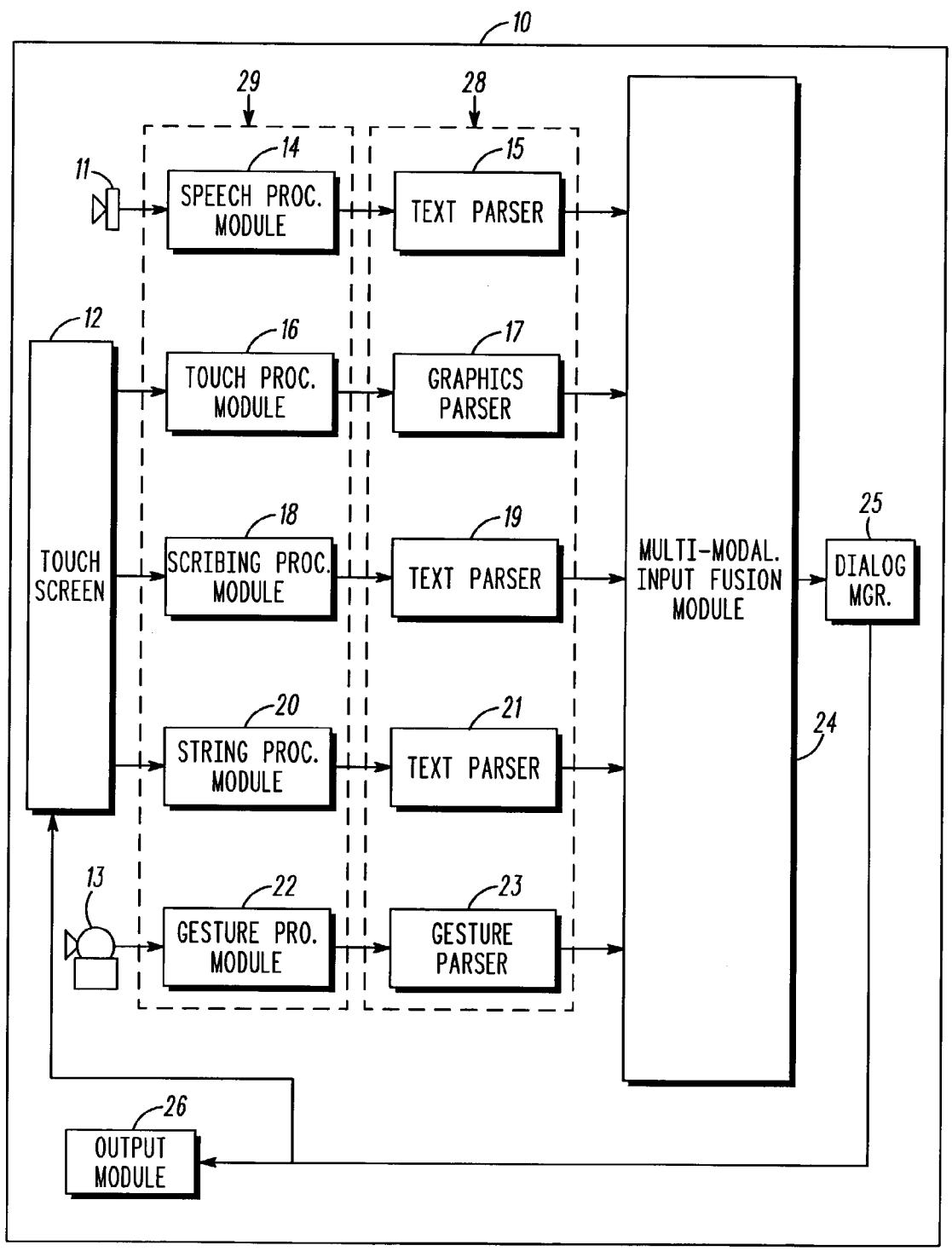
FIG. 1 is a schematic block diagram illustrating a multi-modal data fusion system in accordance with the invention.

In the drawings, like numerals on different Figs. are used to indicate like elements throughout. With reference to FIG. 1 there is illustrated a multi-modal data fusion system 10 comprising a plurality of parsers 28 (in the form of parsers 15,17,19,21,23) coupled to a respective one of a plurality of modality processing modules 29 (in the form of processing modules 14,16,18,20,22). In this embodiment, a speech processing module 14 is coupled to a text parser 15, a touch processing module 16 is coupled to a graphics parser 17, a scribing processing module 18 is coupled to a text parser 19, a string processing module 20 is coupled to a text parser 21 and a gesture processing module 22 is coupled to a gesture parser 23.

The multi-modal data fusion system 1 also includes a multi-modal fusion module 24 having inputs coupled to outputs of all the parsers 28. There is also a dialogue manager 25 coupled to an output of the fusion module 24 and there are input devices IDs in the form of a microphone 11, touch screen 12 and camera 13 coupled respectively to associated ones of the modality processing modules 29.

An output of the dialog manager 25 is coupled to an output unit 26 that provides a response to a user, the response being for instance an audible signal such a synthesized voice, or visual data and information such as text or graphics. The output of the dialog manager 25 may be alternatively or also coupled to the touch screen 12 to provide visual data and information to the user.

Figure 2:
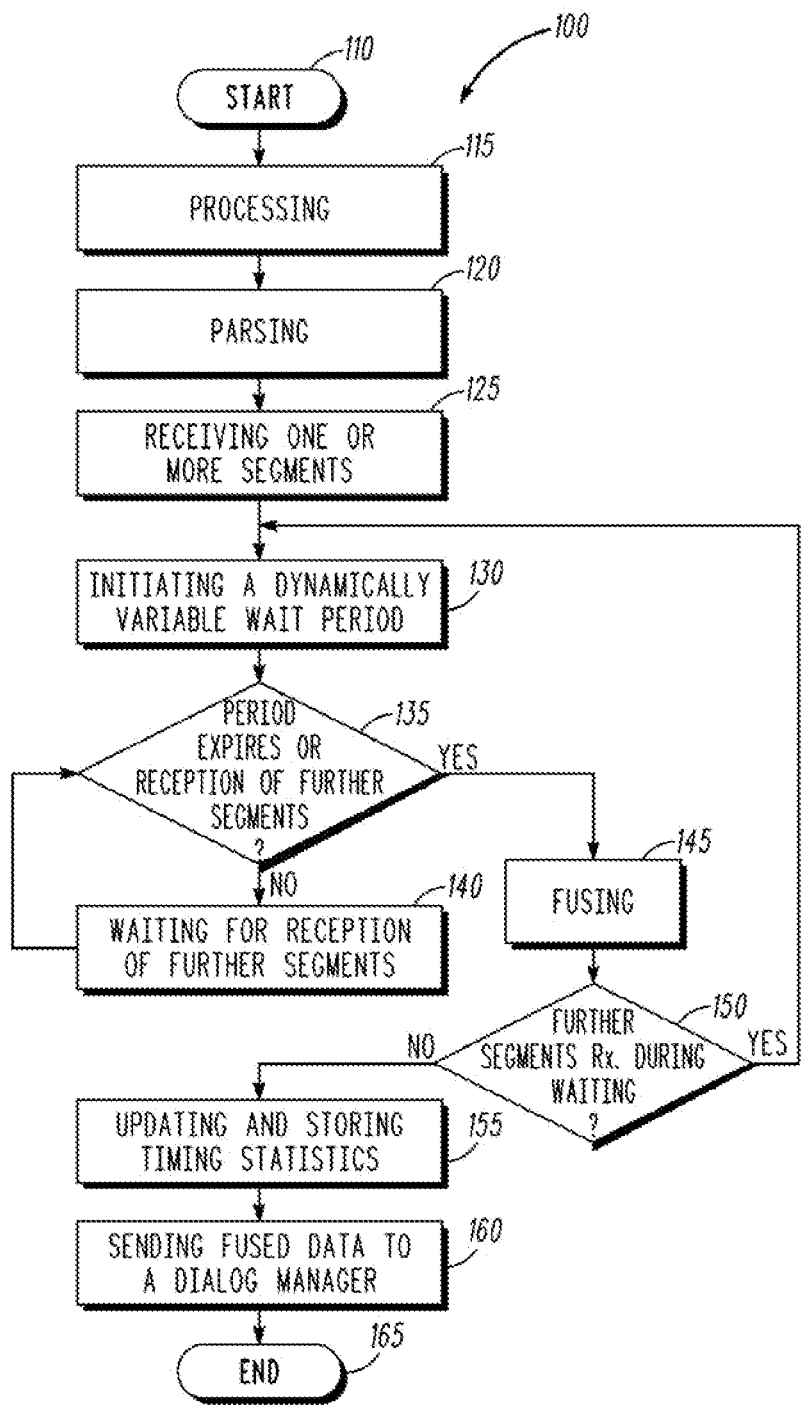
FIG. 2 is a flow diagram illustrating a method for multi-modal data fusion implemented on the multi-modal system of FIG. 1.

Referring to FIG. 2 there is shown a flow diagram illustrating a method 100 for multi-modal data fusion implemented on the multi-modal system 10. Typically, at a start step 100, a user will actuate one of the input devices IDs, for example, the microphone 11 may be actuated by the user simply speaking a phrase "I want to go to". A processing step 115 is then effected by the speech processing module 14 to provide a data string in the form of a text string that is parsed at a parsing step 120 by the text parser 15. Text parsers 15, 19 and 21 parse the input text strings and output semantic frames that include temporal information. A description of these text parsers 15, 19 and 21 can be found in James Allen, *Natural Language Understanding* (2nd Edition), Addison-Wesley, 1995 and is incorporated into this specification by reference.

The graphic parser 17 is similar to the text parser in that it uses the same grammar formalism to represent relationships between graphic objects. The graphic parser 17 interprets input from the touch processing module 16 and outputs semantic frames that include temporal information. The gesture Parser 23 can be implemented similarly to graphic parser 17 and parser 17 interprets output requests from the gesture processing module 22 to provide semantic frames. The speech processing module 14 processes speech signals and provides an output of a sequence of words or word graphs and is decscribed in Lawrence Rabiner, Biing-Hwang Juang, *Fundamentals of Speech Recognition*, Prentice Hall PTR, 1993 and is incorporated into this specification by reference. The touch processing module 16 receives input data from touch screen 12 and maps the input data to objects that can be represented by a list of symbols and relationships between the symbols and provides an output of the list of symbols of mapped objects.

The scribing processing module 18 process input requests and provides output requests as sequences of words. The scribing processing module 18 is described in Seong-Whan Lee, *Advances in Handwriting Recognition*, World Scientific, 1999 and is incorporated into this specification by reference. The string processing module 20 captures input characters and generates a sequence of words based on spaces between the characters. The gesture processing module 22 processes visual input and generates a sequence of symbols that represent a particular category of gestures. The gesture processing module 22 is described in Ming-Hsuan Yang, Narendra Ahuja, *Face Detection and Gesture Recognition for Human-Computer Interaction* (*The Kluwer International Series in Video Computing*, 1) Kluwer Academic Publishers, 2001 and is incorporated into this specification by reference After the parsing step 120 a receiving step 125 is effected, wherein the fusion module 24 effects receiving of one or more segments of multi-modal data, each of said segments being associated respectively with the modalities. For example, a segment in the form a frame that includes a parsed form from of "I want to go to" from text parser 15 is received at the fusion module 24. The frame also includes temporal information that comprises of pairs of typed features and feature values, a feature value can be another nested frame. Below in example 1 there is an example of a frame identified as Frame F1.

$$\begin{bmatrix} \text{Type:} & \text{Go\_to\_location} \\ \text{Modality\_name:} & \text{Speech} \\ \text{startinPoint:} & 10:15:13.23 \\ \text{endingPoint:} & |10:15:15.00 \end{bmatrix}$$

EXAMPLE 1

An Example of a Frame F1 Generated by the Text Parser

In Example 1, the text parser 15 parses the phrase "I want to go to" that is provided by the speech processing module 14 and generates a predicate "Go_to_location" (based on both domain grammar rules and semantics). The predicate is then mapped to the TYPE "Go_to_location" and the frame is identified as Frame F1.

After Frame 1 is identified, the fusion module 24 effects a initiating step 130 for initiating a dynamically variable wait period after one of the segments is received (e.g. Frame F1). This dynamically variable wait period has a duration determined from data fusion timing statistics of the system 10, the data fusion timing statistics being historical statistical data of the system 10.

The fusion module 24 then enters a test step 135 and a waiting step 140 loop until either the dynamically variable wait period has expired or further segments are received. Upon the dynamically variable wait period expiring or if a further segment is received, the method 100 breaks out of the test step 135 and waiting step 140 loop. A fusing step 145 is effected by fusion module 24 to effect a fusing of any segments received during the above steps 125 to 140 to provide fused data. If it is determined at a test step 150 that one or more further segments were received during the dynamically variable wait period, then the method 100 returns to step 130 and the above steps 125 to 140 are repeated. Alternatively, if no further segments were received during the dynamically variable wait period then a step of updating and storing timing statistics step 155 and a send step 160 provides for sending the fused data to the dialog manager. The method then terminates at an ends step 165.

The duration of the timing statistics, and wait periods, are determined from historical statistical data of the system as follows:

For each modality (m) input to one of the processing modules 29, the fusion module maintains:

A variable count $C_m$—which holds the number of frames received from each modality m since startup;

A variable average duration $AvgDur_m$;

A dynamically variable wait period time window (TW) that determines the maximum time difference between the start times of two pieces of information (contained in respective frames) that can be combined together;

A variable average duration, AvgDur;

A variable average time difference, AvgTimeDiff;

A variable frame count, C, which holds the number of frames in the current user turn;

An end Capture Time of last frame, ECT that is set to 0 at reset; and

A start Capture Time of last frame, SCT that is set to 0 at reset.

Also, each input Frame, $F_n$, contains at least:

A Modality Name, N; (type)

A Start of Capture time, $SC_n$; (the starting point) and

A End of Capture time, $EC_n$ (the ending point).

From the above definitions, the timing statistics are updated such that when an input frame, $F_n$, from modality, m, is received:

a) $AvgDur_m$ for that modality is updated using $AvgDur_m = (C_m * AvgDur_m + (EC_n - SC_n))/(C_m + 1)$ b) AvgDur is recalculated using the weighted mean $$AvgDur = \frac{\sum_m C_m * AvgDur_m}{\sum_m C_m}$$

c) Count for that modality, $C_m$ is incremented by 1 d) If (ECT !=0) then
   a. AvgTimeDiff is updated using $AvgTimeDiff = (C*AvgTimeDiff+(SC_n-ECT))/(C+1)$ e) Frame count, C, is incremented by 1 f) ECT is set to $EC_n$ g) SCT is set to $SC_n$ h) The frame is stored within a collection of frames for the current user turn If no input is received and a time equal to the time window TW is elapsed after the current value of SCT, then integration is performed with all the frames received in the current turn.

When integration is started
a. ECT is reset to 0
b. SCT is reset to 0
c. The dynamically variable wait period time window TW is therefore updated using the following:

$TW=\min(\max(AvgDur_m)$ or $(AvgTimeDiff+AvgDur))$ where $AvgDur_m$ is a value indicative of the average duration associated with processing a user request into a one of said segments for a modality m, AvgTimeDiff is a value indicative of an average period for periods starting after completion of receiving one of said segments and ending after completion of receiving a further one of said segments, and AvgDur is a value indicative of the average duration associated with processing a user request into a one of said segments for every modality in the system.

In a more generic sense $TW(t)=f(TW|_0^{t-1})|m$ where m represents the modalities. Thus, the time window TW at time t is an ergodic process that is conditioned by modality factors such as modality state or ambiguity in information. Hence, the time window TW may not be only affected by the input times but it could also be affected by the modality m. Further, the historical statistical data typically includes average segment creation time for each modality m of the system 10. In addition, the duration of the dynamically variable wait period time window TW is further determined from analysis of a period starting after completion of receiving one of the segments and ending after completion of receiving a further one of the segments.

Figure 3:
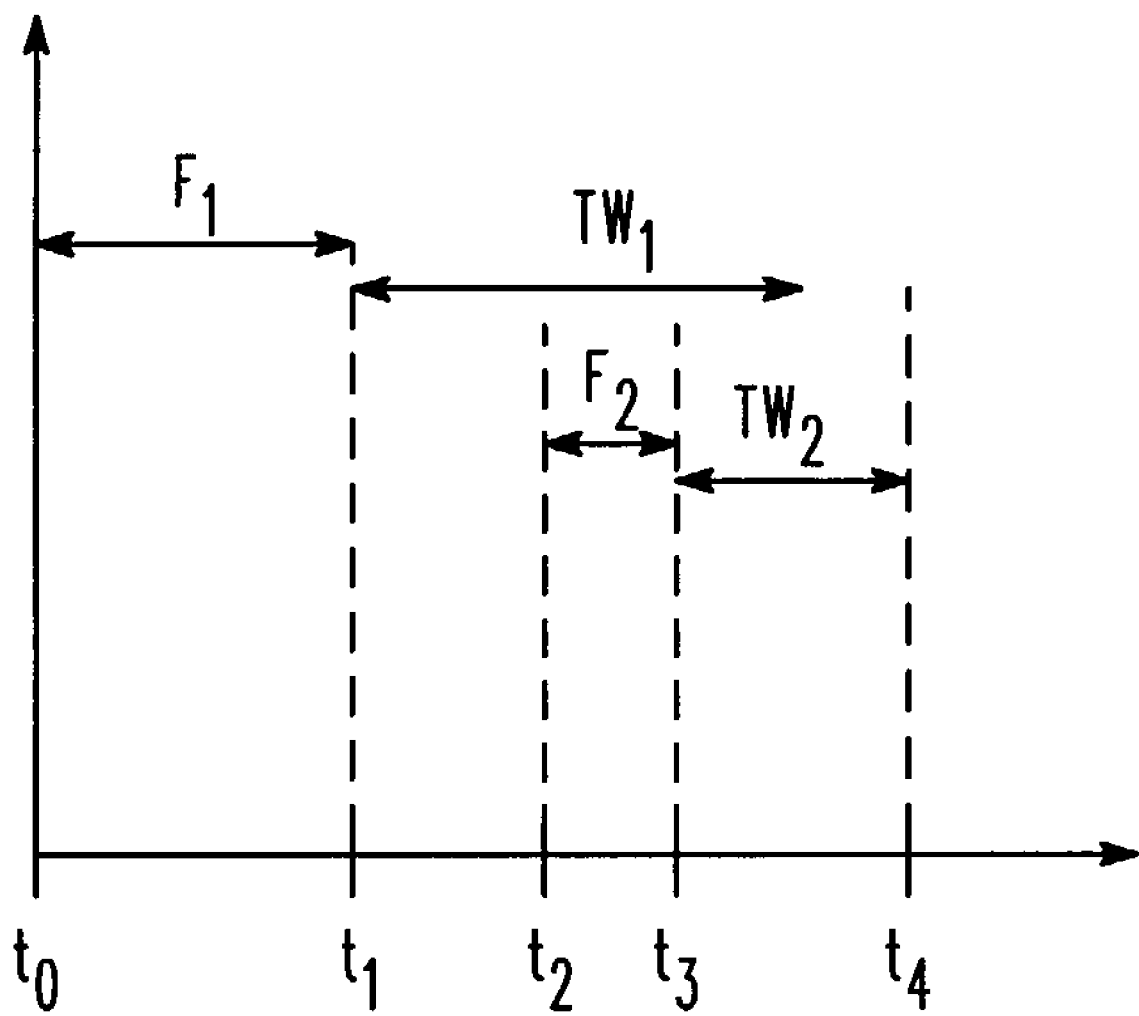
FIG. 3 is a timing diagram illustrating a dynamically variable wait period used in the method of FIG. 2.

Referring to FIG. 3, there is a timing diagram illustrating dynamically variable wait period time windows TWs. For instance, at a time $t_o$, the speech module 14 starts processing a speech input (from speaker 11) such as "I want to go to" to provide a data string in the form of a text string Ts. Then, at time $t_1$, the text parser 15 has parsed the text string Ts and provided the frame F1, also at time $t_1$ the fusion module 24 initiates a dynamically variable wait period time window $TW_1$.

At a time $t_2$; the touch processing module 14 is actuated to start processing x,y co-ordinates of a map displayed on the touch screen 12 to provide a data string in the form of a graphics string Gs, where the x,y co-ordinates are selected by a user touching the touch screen 12. Then at a time $t_3$ the graphics parser 17 has parsed the graphics string Ts and provided a frame F2 and the wait period $TW_1$ has not expired, therefore at time $t_3$ the fusion module 24 initiates another dynamically variable wait period $TW_2$. An example of frame F2 generated by the graphics parser 17 is given below in example 2 in which x,y co-ordinates of a map on touch screen 12 are selected by a user. The frame F2 is generated as Type Hotel by a map database associated with parser 17 that associated the selected x,y co-ordiantes as a Hotel that is known as the Grace Hotel.

$$\begin{bmatrix} \text{Type:} & |\text{Hotel} \\ \text{Modality\_Name:} & \text{Touch} \\ \text{startingPoint:} & 10:15:13.33 \\ \text{endingPoint:} & 10:15:14:00| \\ \text{Content:} & \\ \text{Name:} & \text{Grace Hotel} \\ \text{Location:} & \begin{bmatrix} \text{Type:} & \text{Street\_Location} \\ \text{Street\_no:} & 12 \\ \text{Street\_name:} & \text{Lord Street} \\ \text{Suburb:} & \text{Botany} \\ \text{Zip:} & 2019 \end{bmatrix} \end{bmatrix}$$

EXAMPLE 2

An Example of a Frame F2 Generated by the Graphics Parser.

Assuming at a time $t_4$ the dynamically variable wait period time window $TW_2$ has expired and data in frame $F_1$ and frame $F_2$ are fused and sent to the dialog manager 25.

Advantageously, dynamically variable wait period used in the present invention alleviates or reduces observable delays that can be caused by static wait periods used in conventional multi-modal data fusion systems. In use, the fusion module 24 of the present invention receives one or more segments of multi-modal data, in the form of frames, from at least one of the parsers 28 and initiates a dynamically variable wait period after one of the segments is received. The dynamically variable wait period has a duration determined from data fusion timing statistics of the system 10. The fusion module 24 then waits for reception of any further segments during the dynamically variable wait period and fuses said segments received to provide fused data that is sent to the dialog manager 25. A completed set of fused data received during the steps of the above method 100 provides as a response to a user by either or both the touch screen 12 and output unit 26.

The detailed description provides a preferred exemplary embodiment only, and is not intended to limit the scope, applicability, or configuration of the invention. Rather, the detailed description of the preferred exemplary embodiment provides those skilled in the art with an enabling description for implementing a preferred exemplary embodiment of the invention. It should be understood that various changes may be made in the function and arrangement of elements without departing from the spirit and scope of the invention as set forth in the appended claims.

We claim:

1. A method for multi-modal data fusion in a multi-modal system comprising a plurality of input modalities, the method comprising the steps of:
   (i) Receiving one or more segments of multi-modal data, each of said segments being associated respectively with said modalities;
   (ii) Initiating a dynamically variable wait period after one of said segments is received, said dynamically variable wait period having a duration determined from data fusion timing statistics of the system, wherein the duration of the dynamically variable wait period is determined from analysis of the following:
   min (max($AvgDur_m$) or ($AvgTimeDiff+AvgDur$)) where $AvgDur_m$ is a value indicative of the average duration associated with processing a user request into a one of said segments for a modality m, AvgTimeDiff is a value indicative of an average period for periods starting after completion of receiving one of said segments and ending after completion of receiving a further one of said segments, and AvgDur is a value indicative of the average duration associated with processing a user request into a one of said segments for every modality in the system;
   (iii) Waiting for reception of any further said segments during said dynamically variable wait period; and
   (iv) Fusing said segments received during said steps (i) to (iii) to provide fused data.

2. A method for multi-modal data fusion, as claimed in claim 1, further characterized by repeating steps (ii) to (iv) if one or more said further said segments are received during said dynamically variable wait period.

3. A method for multi-modal data fusion, as claimed in claim 1, including the further step of sending said fused data to a dialog manager.

4. A method for multi-modal data fusion, as claimed in claim 1, wherein said segments are frames.

5. A method for multi-modal data fusion, as claimed in claim 4, wherein said frames include temporal characteristics including at least part of said historical statistical data; the frames may also include semantic representations of an associated user request.

6. A multi-modal data fusion system comprising:
   a plurality of modality processing modules;
   a plurality of parsers coupled to a respective one of said modality processing modules; a multi-modal fusion module having inputs coupled to outputs of said parsers, wherein in use said fusion module receives one or more segments of multi-modal data from at least one of said parsers, and initiates a dynamically variable wait period after one of said segments is received, said dynamically variable wait period having a duration determined from data fusion timing statistics of the system, the fusion module then waits for reception of any further said segments during said dynamically variable wait period and fuses said segments received to provide fused data, wherein the duration of the dynamically variable wait period is determined from analysis of the following:
   min (max($AvgDur_m$) or ($AvgTimeDiff+AvgDur$)) where $AvgDur_m$ is a value indicative of the average duration associated with processing a user request into a one of said segments for a modality m, AvgTimeDiff is a value indicative of an average period for periods starting after completion of receiving one of said segments and ending after completion of receiving a further one of said segments, and AvgDur is a value indicative of the average duration associated with processing a user request into a one of said segments for every modality in the system.

7. A multi-modal data fusion system as claimed in claim 6, wherein there is a dialogue manager coupled to an output of said fusion module.

8. A multi-modal data fusion system as claimed in claim 6, there are user input devices coupled respectively to said modality processing modules.

9. A multi-modal fusion module having inputs for coupling to outputs of parsers, wherein in use said fusion module receives one or more segments of multi-modal data from at least one of said parsers, and initiates a dynamically variable wait period after one of said segments is received, said dynamically variable wait period having a duration determined from data fusion timing statistics of the system, the fusion module then waits for reception of any further said segments during said dynamically variable wait period and fuses said segments received to provide fused data, wherein the duration of the dynamically variable wait period is determined from analysis of the following:
   min (max($AvgDur_m$) or ($AvgTimeDiff+AvgDur$)) where $AvgDur_m$ is a value indicative of the average duration associated with processing a user request into a one of said segments for a modality m, AvgTimeDiff is a value indicative of an average period for periods starting after completion of receiving one of said segments and ending after completion of receiving a further one of said segments, and AvgDur is a value indicative of the average duration associated with processing a user request into a one of said segments for every modality in the system.

* * * * *